United States Patent [19]
Kouchi

[11] Patent Number: 6,075,580
[45] Date of Patent: *Jun. 13, 2000

[54] ACTIVE MATRIX TYPE LIQUID CRYSTAL DISPLAY APPARATUS WITH CONDUCTIVE LIGHT SHIELD ELEMENT

[75] Inventor: Tetsunobu Kouchi, Hiratsuka, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/361,182

[22] Filed: Dec. 21, 1994

[30] Foreign Application Priority Data

Dec. 28, 1993 [JP] Japan .................................... 5-334417
Dec. 1, 1994 [JP] Japan .................................... 6-298395

[51] Int. Cl.[7] .................................................. G02F 1/1333
[52] U.S. Cl. ............................ 349/110; 349/44; 349/111; 349/116; 349/143; 259/59; 259/72
[58] Field of Search ............................... 349/42–44, 110, 349/111, 143, 116; 257/59, 72

[56] References Cited

U.S. PATENT DOCUMENTS

| | | | |
|---|---|---|---|
| 5,317,433 | 5/1994 | Miyawaki et al. | 359/59 |
| 5,786,876 | 7/1998 | Ota et al. | 349/111 |

FOREIGN PATENT DOCUMENTS

| | | |
|---|---|---|
| 0556484 | 8/1993 | European Pat. Off. . |
| 62-026858 | 2/1987 | Japan . |
| 63-273838 | 11/1988 | Japan . |
| 4-364028 | 9/1992 | Japan . |

*Primary Examiner*—Fetsum Abraham
*Attorney, Agent, or Firm*—Fitzpatrick, Cella, Harper & Scinto

[57] ABSTRACT

An active matrix type liquid crystal display apparatus includes a liquid crystal layer disposed between a device substrate and an opposite substrate wherein the device substrate includes: a plurality of switching elements disposed at a plurality of locations determined by data signal interconnections and scanning signal interconnections; and a plurality of pixel electrodes disposed at locations corresponding to the plurality of switching elements, the plurality of pixel elements being connected to the corresponding switching elements, and wherein the opposite substrate includes an opposite electrode disposed opposite to the pixel electrodes, the active matrix type liquid crystal display apparatus being characterized in that: a light shielding layer having electrical conductivity is disposed at least partially on the data signal interconnections or the scanning signal interconnections via an insulating layer; the pixel electrodes are disposed on the light shielding layer via a second insulating layer; and a voltage is applied to the light shielding layer.

15 Claims, 14 Drawing Sheets

```
TRANSMITTANCE
    (%)

100

50

0
         Vmin              Vmax
              SIGNAL VOLTAGE (V_LC)
```

ACTIVE MATRIX TYPE LIQUID CRYSTAL DISPLAY APPARATUS WITH CONDUCTIVE LIGHT SHIELD ELEMENT

BACKGROUND OF THE INVENTION

1. Field of the Invention

The present invention relates to an active matrix type liquid crystal display apparatus for displaying a high-resolution image such as a TV picture.

2. Description of the Related Art

In recent years, liquid crystal displays have become popular in a wide variety of applications such as a display panel for computer or a word processor, measurement instrument display panel, etc. One of such liquid crystal displays is a simple matrix type in which there are provided a pair of substrates each having stripe-shaped electrodes wherein these substrates are disposed at locations opposite to each other such that the stripe-shaped electrodes of one substrate cross those of the other substrate. This type of liquid crystal display exhibits performance good enough to display clock time or a simple image. However, the time-division driving technique used in this display has a limitation in that this technique cannot drive a huge number of pixels included in a high-resolution image such as a TV picture. To avoid this problem with the simple matrix scheme, an active matrix technique has been under intense research and development in recent years.

In liquid crystal displays of the active matrix type, one substrate has a common electrode, and the other substrate has pixel electrodes corresponding to individual pixels wherein a thin film transistor (hereafter referred to as TFT) acting as a switching element is disposed at each pixel thereby controlling the driving of each pixel. Each TFT has two main electrodes called source and drain and also has a control electrode called gate. In the active matrix technique, one of main electrodes is connected to a signal line, the other is connected to a pixel electrode, and the gate is connected to a scanning line. Which of the main electrodes acts as a source electrode depends on the type of a transistor and the polarity of an applied voltage. In this description, it is assumed that an electrode connected to a display signal line acts as a source electrode, and the other electrode connected to a pixel electrode acts as a drain electrode.

FIG. 15 illustrates a circuit of a liquid crystal display of the active matrix type. In FIG. 15, reference numerals 2 and 3 denote a scanning line and signal line, respectively, and reference numeral 4 denotes a pixel electrode. Reference numeral 18 denotes a common storage capacitor electrode, and reference numeral 19 denotes a TFT. In the active matrix type liquid crystal display shown in FIG. 15, scanning lines 2 and signal lines 3 are arranged in a matrix form, wherein the operation of TFTs 19 disposed at individual pixels is controlled thereby controlling the voltage applied to the pixel electrodes 4 so that a desired image is displayed.

Top and side views of a pixel are shown in FIG. 14, wherein FIG. 14(b) is a cross-sectional view taken along line A–A' of FIG. 14(a) showing a gate electrode 1, a semiconductor layer 5, a source electrode 6, a drain electrode 7, and a light shielding layer 9.

There are also shown inter-layer insulating layers 8, a substrate 11, orientation films 12, a liquid crystal material 13, an opposite transparent electrode 14, a film 15 disposed between adjacent layers, an opposite transparent substrate 16, and a color filter 17.

As shown in FIGS. 14(a) and (b), a gate electrode 1 is formed, via an inter-layer insulating layer 8, on a semiconductor layer 5 formed on an insulating and transparent substrate 11, then an additional inter-layer insulating layer 8 is deposited on it. Contact holes are then formed in the inter-layer insulation layer 8, and source and drain electrodes 6 and 7 are formed via these contact holes. Usually, the semiconductor layer 5 is made up of a material such as polysilicon, amorphous silicon (a-Si), or single-crystal silicon. The gate electrode 1 and the scanning line 2 are made up of a material such as a polysilicon of a-Si that can be easily formed by means of evaporation. The source electrode 6 and the signal line 3 are made of metal such as Al, and the drain electrode 6 and the pixel electrode 4 are made of transparent ITO (Indium Tin Oxide). A storage capacitor electrode 18 is formed by the same process as that for the gate electrode 1, such that a storage capacitor (Cs) is formed between the storage capacitor electrode 18 and the pixel electrode 4.

A light shielding layer 9 is formed on an opposite substrate 16 located opposite to the TFT substrate wherein the light shielding layer 9 is made up of metal such as chromium, and a color filter layer is further formed on it. Furthermore, an opposite transparent electrode 14 is formed on an intermediate film 15. Usually, the opposite transparent electrode is made up of ITO.

An orientation film 12 is formed on the surface of the TFT substrate and also on the surface of the opposite substrate. In general, the orientation film is made of a material such as polyimide. After orientating process is performed on the orientation films 12, both substrates are bonded to each other via a gap element, and a liquid crystal material 13 is then placed between the substrates. Thus, a complete liquid crystal display panel is obtained.

FIG. 16 illustrates the basic concept of a conventional apparatus for driving an active matrix liquid crystal device.

This driving apparatus comprises: pixels each comprising a liquid crystal cell 701 having a liquid crystal material disposed between a pixel electrode 5 and an opposite electrode 14 (voltage $V_{COM}$ is applied to it), a pixel TFT 702, and a storage capacitor 712; vide signal interconnection lines (hereafter referred to as signal lines) 703; a line buffer 704; a shift pulse switch 708; a horizontal shift register 705; a gate signal interconnection (hereafter referred to as gate interconnection) 711; and a vertical shift register 706, wherein a video signal is applied via a signal input terminal and transferred to pixels or lines while varying the transfer timing for each pixel or line.

FIG. 19 illustrates the timing of driving pulses applied to the active matrix liquid crystal device according to the conventional technique. In FIG. 19, driving is performed line to line. One line of video signal $V_{IN}$ to be written into the liquid crystal device is supplied to the buffer 704 via the shift pulse switches 708 driven by a signal that is provided by the horizontal shift register 705 in synchronism with the frequency of the video signal, and the video signal $V_{IN}$ is stored in the buffer 704. When the line buffer 704 has stored the vide signal for all pixels on a certain line for example the n-th line, the pixel vide signal $V_{LCn}$ is written into each liquid crystal cell 701 disposed on the line via output switches 710 of the line buffer 704 wherein the output switches 710 are turned on in response to a signal S1 and via the pixel switches 702 that are turned on in response to a signal S2 provided by the vertical shift register 706. The signal transfer to each liquid crystal cell is generally performed for all cells located on a line at the same time during a blanking period in a horizontal scanning period. By varying the timing as described above, the pixel video signals $V_{LCn}$, $V_{LCn+1}$, . . . , are written line to line.

Liquid crystal molecules in each cell move in response to the signal voltage transferred in the above-described manner, and thus a corresponding change in the transmittance of each cell occurs depending on the orientation of polarizing plates disposed such that cross polarization holds. The change in the transmittance is illustrated in FIG. 17.

In FIG. 17, the signal voltage $V_{SIG}$ plotted along the horizontal axis has different meanings depending on the type of a liquid crystal used. For example, when a TN liquid crystal is used, the value of the signal voltage $V_{SIG}$ is defined by an effective voltage value ($V_{rms}$). Referring to FIG. 18, a qualitative explanation on the value of the signal voltage $V_{SIG}$ will be given below. To prevent the liquid crystal from being supplied with a DC component, the polarity of the signal voltage is inverted every frame, although the liquid crystal itself operates in response to the AC voltage component represented by hatched areas in FIG. 18. Therefore, the effective voltage $V_{rms}$ can be written as $$V_{rms} = \sqrt{\frac{1}{t_F} \int_0^{t_F} (V_{LC}(t) - V_{COM}) \cdot dt} \quad (1)$$

where $t_F$ denotes the two-frame time period, and $V_{LC}(t)$ denotes the signal voltage that is transferred to a liquid crystal.

Each TFT includes parasitic capacitance (Cgs) between its gate and source. A change in gate voltage induces a shift in the potential of the pixel electrode 4 via the parasitic capacitance Cgs. If such a shift occurs in the pixel potential, a DC voltage component can appear across the liquid crystal 13. This produces an incidental image and flicker, or causes the liquid crystal to be burned, which results in a reliability problem. The shift in the potential due to the parasitic capacitance Cgs can be suppressed by disposing a capacitor Cs at each pixel. If leakage occurs in a TFT, the pixel potential decreases and thus degradation in contrast occurs. This problem can also be suppressed by the capacitance Cs which results in an increase in the pixel capacitance and thus results in suppression of the reduction in the pixel potential.

However, since the storage capacitor electrode is generally made up of an opaque material that is also used to form the gate electrode as described above, the addition of the capacitor Cs causes a problem that the open area ratio of the pixel decreases. For example, to form a capacitor Cs having a sufficiently large capacitance such as 50 fF to obtain the above-described effect on a pixel having an area of 20 $\mu$m×20 $\mu$m, the capacitor Cs will need an area of 145 $\mu$m$^2$ if the capacitor Cs is formed using a silicon dioxide film having a thickness of 1000 Å. Thus, the capacitor Cs will occupy 36% of the pixel area, which will cause a great reduction in the open area ratio. Furthermore, interconnections do not contribute to the open area. Steps at interconnections can cause disturbance in the orientation of the liquid crystal near the steps. Such a region is generally shielded by a shield layer. If this shielding is performed using the shield layer of the filter substrate, then there is an registration error of ± a few microns in the boding process between the filter substrate and the TFT substrate. If this registration error is taken into account, the actual overall open area ratio drops to 15–20%.

To avoid the above problem, one known technique is to form a storage capacitor suing a transparent film such as ITO. However, this technique has another unsolved problem in that reflection by the ITO film occurs which causes a reduction in the amount of light that can be used by a liquid crystal display apparatus.

SUMMARY OF THE INVENTION

In view of the above, it is an object of the present invention to provide a liquid crystal display apparatus having excellent capability of displaying a high-quality image without a reduction in either the open area ratio or the available amount of light.

To achieve the above object, the present invention provides an active matrix type liquid crystal display apparatus including a liquid crystal layer disposed between a device substrate and an opposite substrate wherein the device substrate includes: a plurality of switching elements disposed at a plurality of locations determined by data signal interconnections and scanning signal interconnections; and a plurality of pixel electrodes disposed at locations corresponding to the plurality of switching elements, the plurality of pixel elements being connected to the corresponding switching elements, and wherein the opposite substrate includes an opposite electrode disposed opposite to the pixel electrodes, the active matrix type liquid crystal display apparatus being characterized in that: a light shielding layer having electrical conductivity is disposed at least partially on the data signal interconnections or the scanning signal interconnections via an insulating layer; the pixel electrodes are disposed on the light shielding layer via a second insulating layer; and a voltage is applied to the light shielding layer.

An active matrix type liquid crystal display apparatus in which the display area is defined by an opening edge of a light shielding layer disposed on a device substrate is also within the scope of this invention.

In the liquid crystal display apparatus according to the present invention, the light shielding layer is disposed between the pixel electrodes and the data signal interconnections or the scanning signal interconnections wherein a voltage is applied to the light shielding layer so that storage capacitance is formed between the pixel electrodes and the light shielding layer. The above-described structure allows an addition of storage capacitance thereby suppressing the incidental image, flicker, and burning of the liquid crystal, and also improving the contrast, with no penalty in the open area ratio and in the available amount of light.

DESCRIPTION OF THE PREFERRED EMBODIMENTS

Now several preferred embodiments will be described below to illustrate the invention. However, it is to be understood that the invention is not intended to be limited to the specific embodiments. It is contemplated that modifications, alternatives, and substitutions of constituent elements are within the scope of this invention.

Embodiment 1

Referring to the accompanying drawings, a first embodiment of a liquid crystal display apparatus according to the present invention will be described.

Figure 1A:
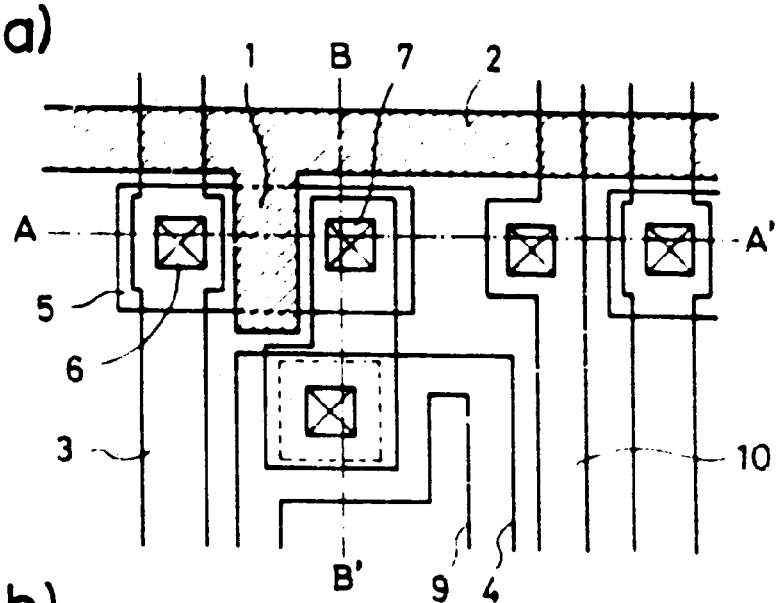
FIGS. 1(a)–(c) are schematic diagrams illustrating an embodiment of a liquid crystal display apparatus according to the present invention.
Figure 1B:
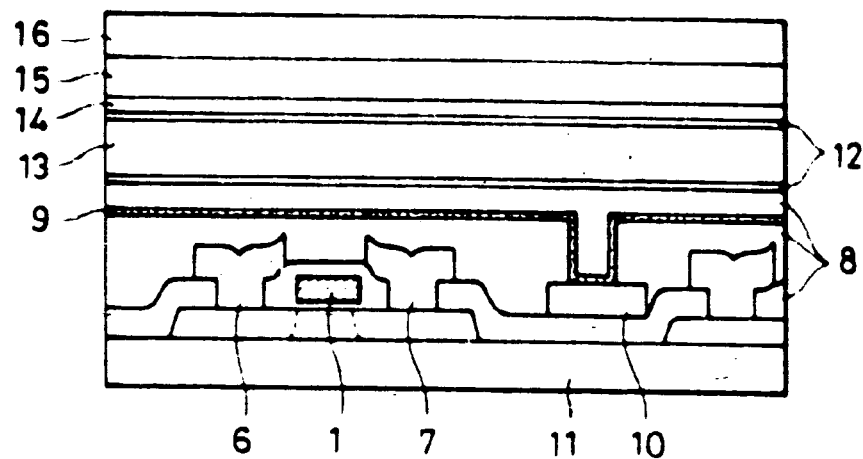
Figure 1C:
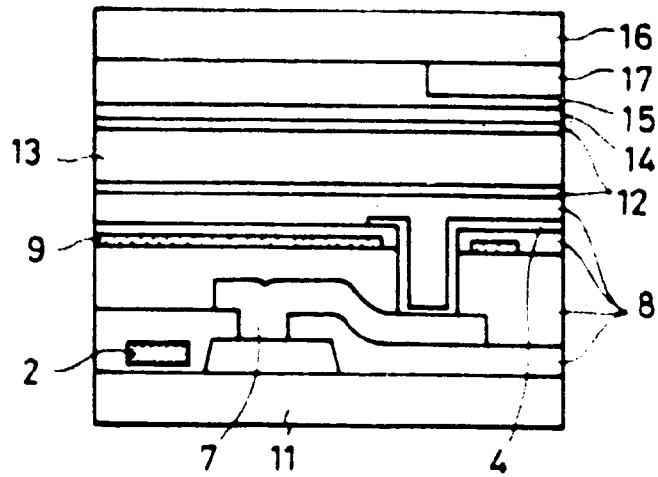

FIG. 1 is a schematic diagram illustrating the first embodiment of the liquid crystal display apparatus, wherein FIG. 1(a) is a plan view of a device substrate, FIG. 1(b) is a cross-sectional view of the liquid crystal display apparatus taken along line A–A' of FIG. 1(a), and FIG. 1(c) is a cross-sectional view of the liquid crystal display apparatus taken along line B–B' of FIG. 1(a).

Figure 2:
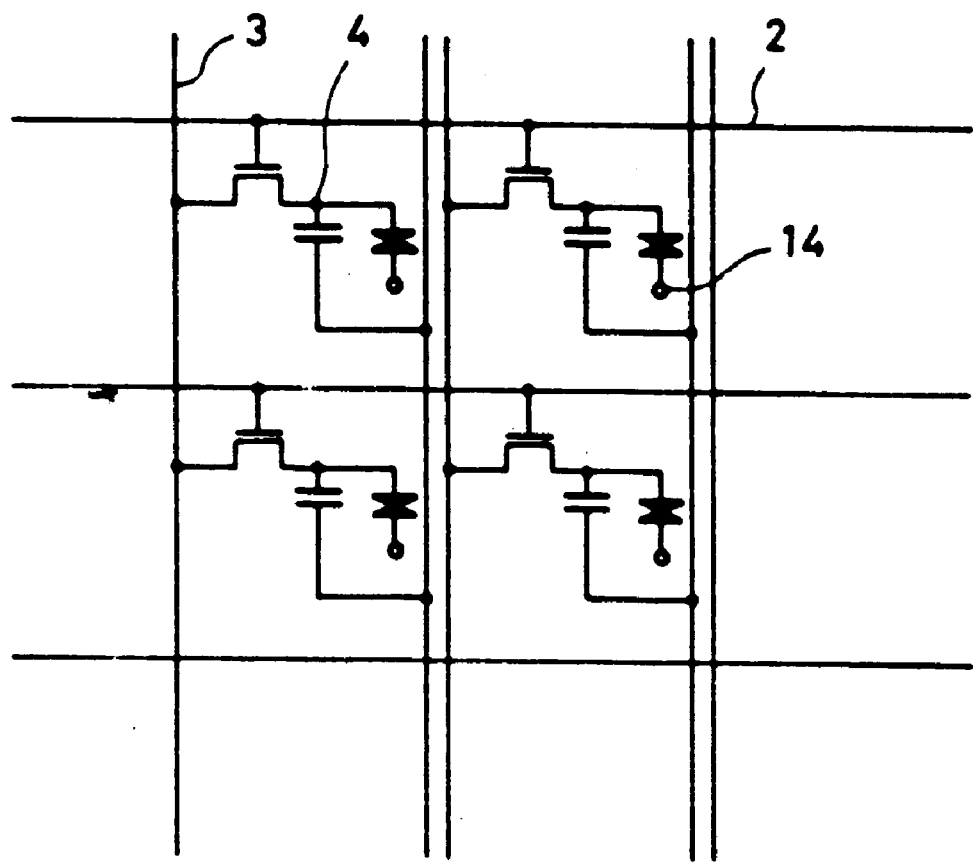
FIG. 2 is an equivalent circuit of the liquid crystal display apparatus of FIG. 1.
Figure 3A:
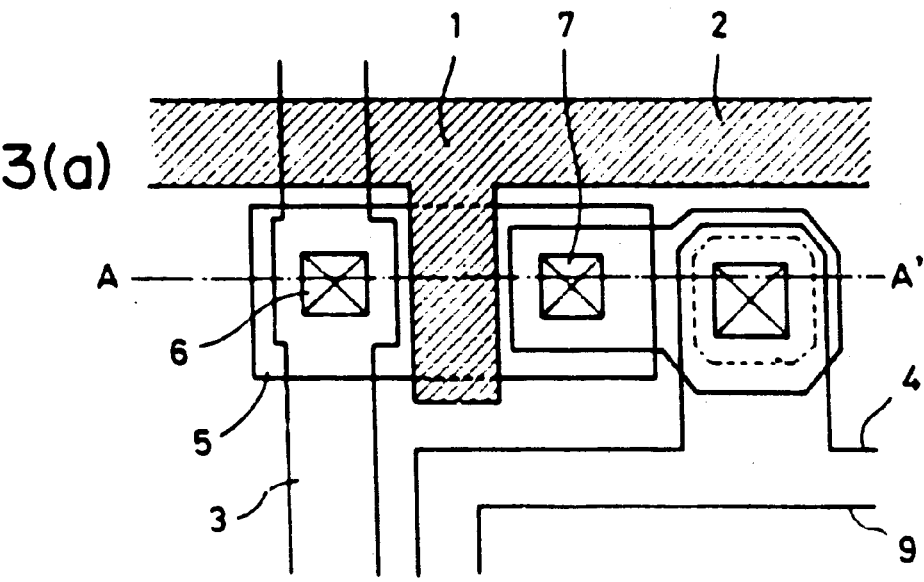
FIGS. 3(a) and (b) are schematic diagrams illustrating another embodiment of a liquid crystal display apparatus according to the present invention.
Figure 3B:
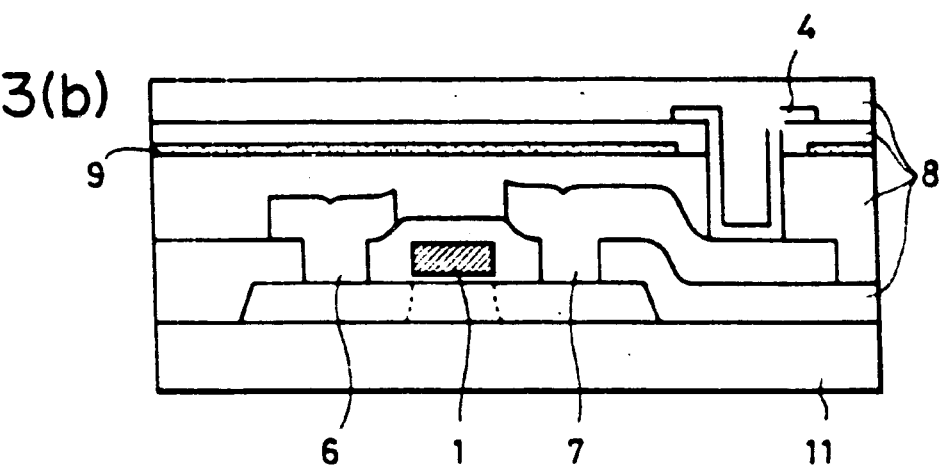

In FIG. 1, there are shown a gate electrode 1, a scanning line 2, a signal line 3, and a pixel electrode 4. There are also shown a semiconductor layer 5, a source electrode 6, a drain electrode 7, a light shielding layer 9 and a common electrode line 10 for maintaining the light shielding layer at a fixed potential. Furthermore, there are also provided an inter-layer insulating layer 8, a substrate 11, an orientation film 12, a liquid crystal material 13, an opposite transparent electrode 14, a film 15 disposed between adjacent layers, an opposite transparent substrate 16, and a color filter layer 17. FIG. 2 is an equivalent circuit associated with the present embodiment.

In the liquid crystal display apparatus according to the present embodiment of the invention, as shown in FIG. 1, a voltage is applied to the light shielding layer 9 via the common electrode line 10 thereby maintaining the potential of this layer at a fixed value. In this embodiment, if the liquid crystal display apparatus is designed to have pixels each having an area of 20 $\mu$m×20 $\mu$m, then the area of one pixel electrode will be about 18 $\mu$m×18 $\mu$m=324 $\mu$m$^2$. If an area of 145 $\mu$m$^2$ overlapping the light shielding layer is added, and a capacitor Cs of 50 fF is further formed as in the above-described example according to the conventional technique, the liquid crystal display apparatus according to the present embodiment can have an open area as large as 324–145=179 $\mu$m$^2$. This means that the open area ratio is large as 44%, which is a great improvement compared to values obtained in conventional techniques.

As for the material of the light shielding layer, it is preferable to employ a material having a low light transmittance and a low resistance, such as Al, TaN, TiN, or a multilayer structure of these materials, although the present invention is not limited to these specific materials.

FIG. 10 is a schematic diagram illustrating a process for producing the liquid crystal display apparatus according to the present embodiment of the invention. First, an SOI (silicon on insulator) substrate is prepared by means of lamination of wafers or deposition of a polycrystalline or amorphous silicon layer 1012 on a glass substrate 11 (refer to FIG. 10(a)). The silicon layer 1012 on the SOI substrate is patterned by a photo etching process thereby forming TFT regions. A gate oxide film 1013 for each TFT is then formed by thermal oxidation technology. A polycrystalline silicon film for gate electrodes is deposited, and then this film is patterned by a photo etching process to form a gate electrode 1 for each TFT. Then, an impurity of the opposite conduction type to that of the silicon layer on the SOI substrate is introduced into regions on both sides of the gate by means of ion implantation and annealing thereby forming source and drain regions 1006 and 1007 (FIG. 10(c)). After TFTs have been formed, an inter-layer insulating film 8 is deposited on them. Contact holes are formed in the inter-layer insulating film, and a conducting film such as Al is deposited on the inter-layer insulating film. Then, the conducting film is patterned to form lead electrodes 6 and 7 for the source and drain as well as interconnections. At this point, common electrode interconnections 10 have also been formed (FIG. 10(d)).

After the formation of these electrodes and interconnections, a second inter-layer insulating film 1008 is deposited, and via-holes are formed in it. Then, Al or TaN is deposited and patterned to form a light shielding film 9. Furthermore, a third insulating film 1018 is deposited, and second via-holes are formed. Then, a transparent conducting film such as ITO is deposited and patterned to form pixel electrodes (not shown). Furthermore, a protection film (not shown) is deposited.

Then, orientating process is performed on it, and the resultant substrate is bonded via a gap material to an opposite substrate that has been prepared separately. A liquid crystal is injected between these substrates (refer to FIG. 1(b)). In the case of a TN (twisted nematic) liquid crystal, polarizing plates are further disposed outside both substrates so that the light transmittance may be varied depending on the polarization angle of light that is controlled by varying the voltage applied to the liquid crystal as described earlier.

In the above description, TFTs are used as devices for driving the liquid crystal. However, the present invention is not limited to the TFT. MIM (metal insulator metal) devices, diodes, or other type devices may also be employed as the driving device.

Furthermore, the present invention is not limited to the transmission type liquid crystal display apparatus, and can also be applied to reflection type liquid crystal display apparatus.

In this invention, it is not necessarily required to maintain the potential of the storage capacitor electrode at a fixed value. A pulse may also be applied to the storage capacitor electrode to control the potential of the pixel electrode. In this case, it is possible to achieve a further reduction in DC voltage component applied to the liquid crystal thereby further reducing the incidental image, flicker, and burning of the liquid crystal.

As described earlier, the change in the potential of the scanning line 2 causes a shift in the potential of the pixel electrode 4. The fluctuation $\Delta V_{LC1}$ in the potential of the pixel electrode can be written as $$\Delta V_{LC1} = \frac{C_{GD}}{C_{GD} + C_{LC} + C_{ADD}} \Delta V_G \qquad (2)$$

where $C_{LC}$ denotes the capacitance of the liquid crystal cell, $C_{ADD}$ denotes the storage capacitance, Cgs denotes the parasitic capacitance between the gate and source of the TFT, and $\Delta V_G$ denotes the change of the gate potential (the swing of the gate voltage required to turn on and off the TFT).

Figure 11:
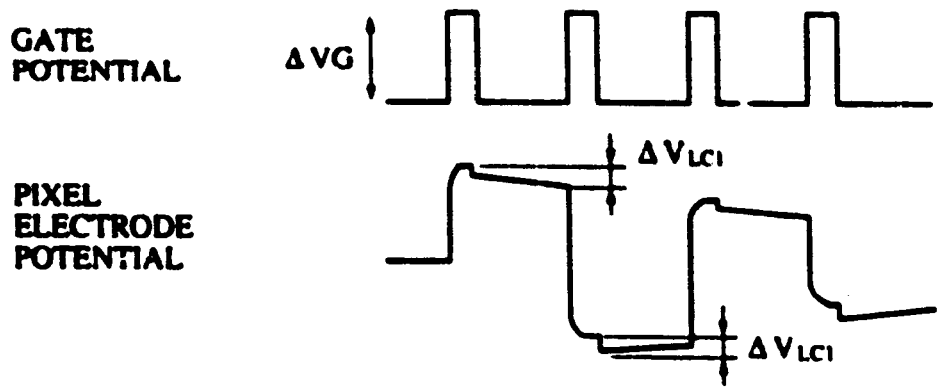
FIG. 11 is a graph illustrating an example of operation of the liquid crystal display apparatus according to the present invention.
Figure 12:
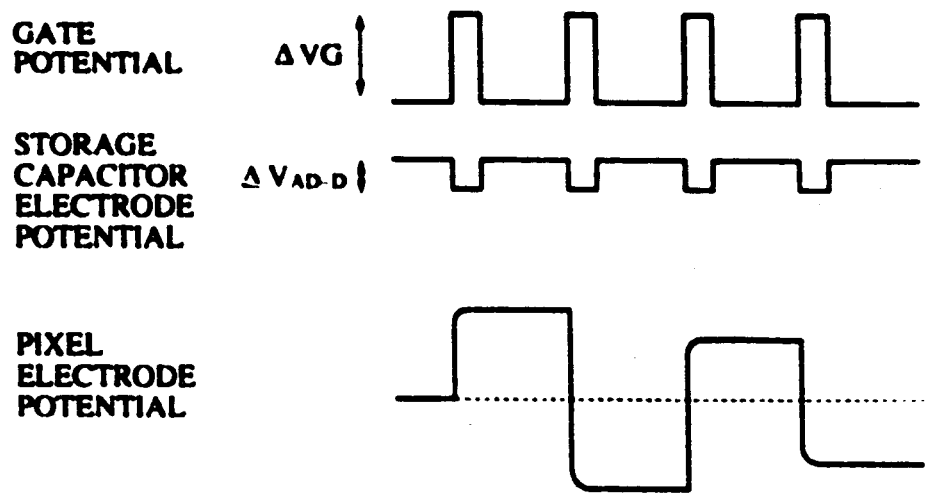
FIG. 12 is a graph illustrating another example of operation of the liquid crystal display apparatus according to the present invention.

It can be seen from the above equation that the fluctuation $\Delta V_{LC1}$ can be reduced by adding the storage capacitance $C_{ADD}$ in parallel to the liquid crystal capacitance $C_{LC}$. FIG. 11 illustrates a change in the potential of the pixel electrode arising from the fluctuation $\Delta V_{LC1}$.

If a pulse is applied to the storage capacitor electrode to produce a change in the potential of the pixel electrode in the opposite direction to that of the above fluctuation, it is possible to cancel the fluctuation $\Delta V_{LC1}$. In this case, if it is assumed that the amplitude of the pulse applied to the storage capacitor electrode is $\Delta V_{ADD}$, then the fluctuation $\Delta V_{LC2}$ in the potential of the pixel electrode can be written as If the value of $\Delta V_{ADD}$ is properly selected so that $$\Delta V_{LC2} = \frac{C_{ADD}}{C_{GS} + C_{LC} + C_{ADD}} \Delta V_{ADD} \qquad (3)$$

Figure 19:
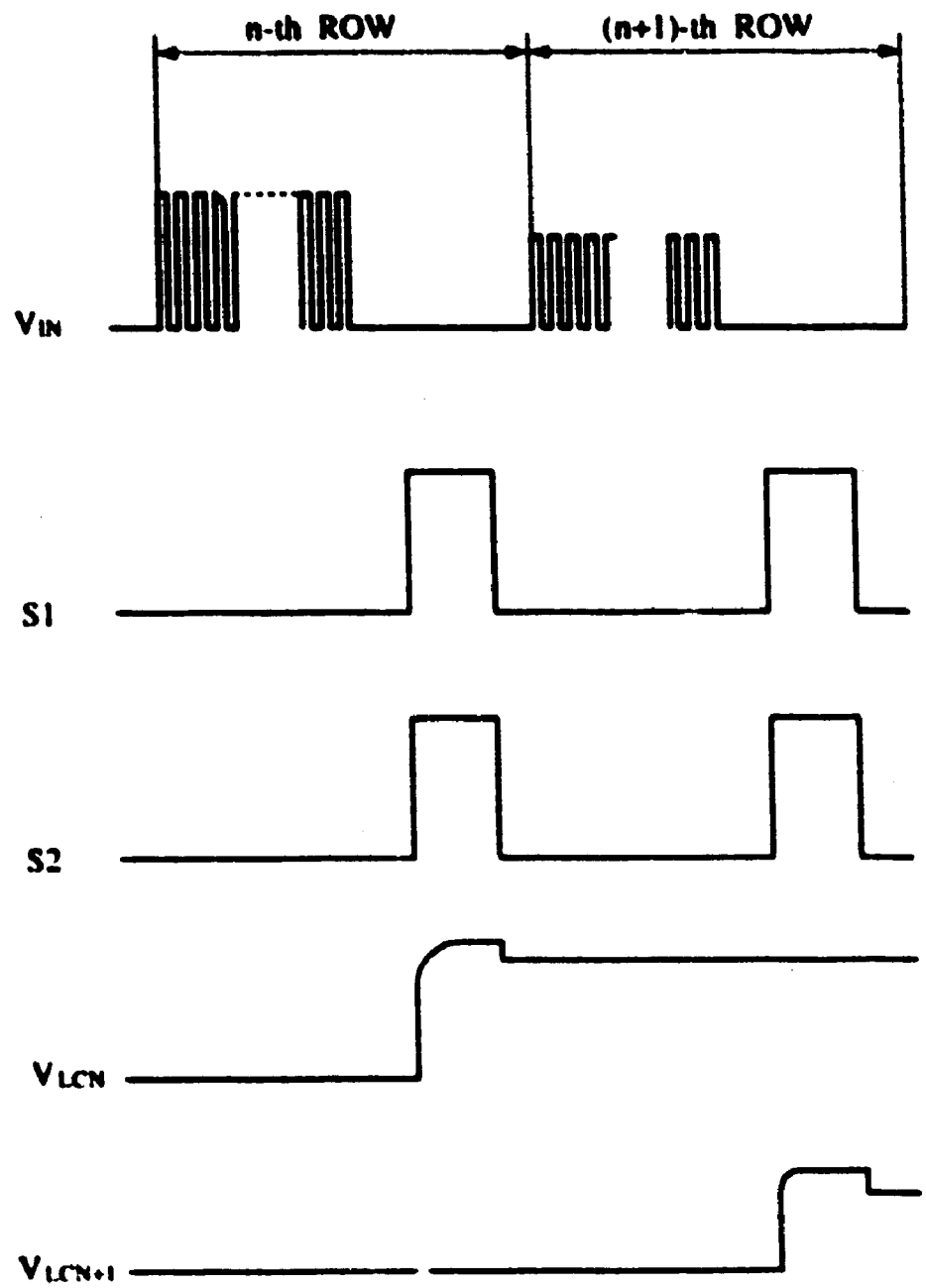
FIG. 19 is a schematic representation of the timing of driving pulses of a liquid crystal display apparatus.

$\Delta V_{LC2} = -\Delta V_{LC1}$, then the fluctuation in the pixel potential will be cancelled as shown in FIG. 19.

The pulse may be applied to storage capacitor electrodes according to a proper method that matches the driving method of the display apparatus: either line to line or to all simultaneously.

Embodiment 2

Figure 4:
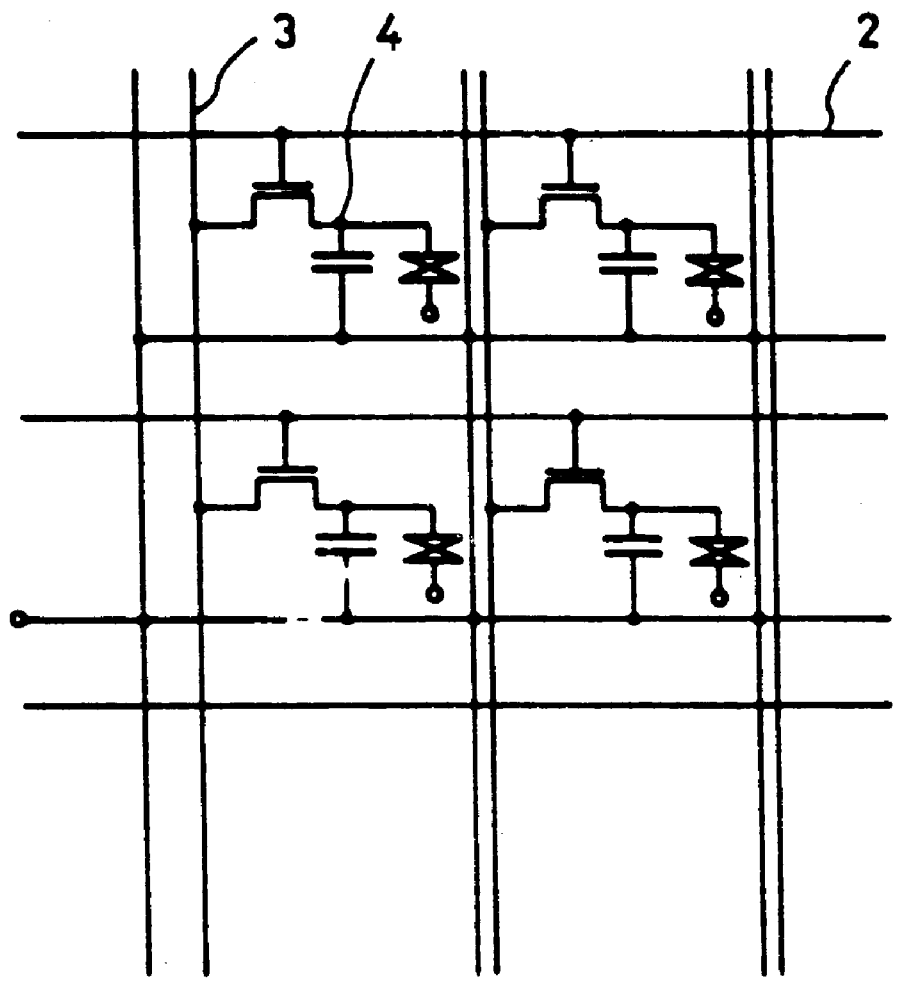
FIG. 4 is an equivalent circuit of the liquid crystal display apparatus of FIGS. 3(a) and (b)
Figure 5:
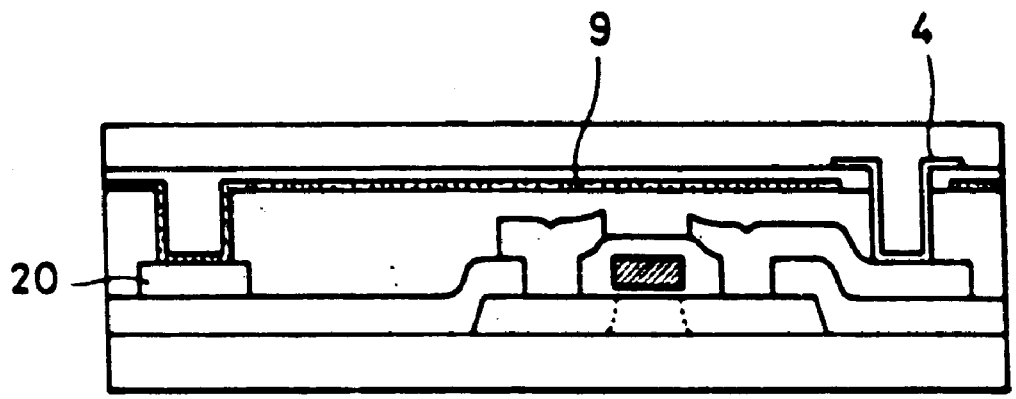
FIG. 5 is a schematic diagram illustrating another embodiment of a liquid crystal display apparatus according to the present invention.
Figure 6:
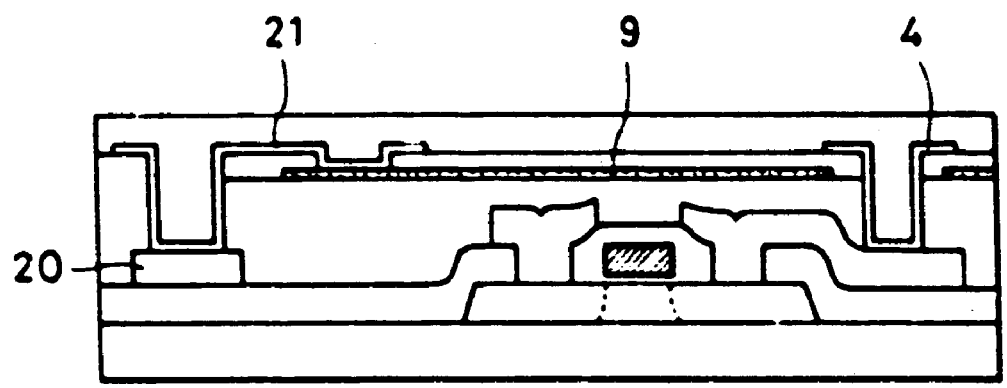
FIG. 6 is a schematic diagram illustrating another embodiment of a liquid crystal display apparatus according to the present invention.

Referring to FIGS. 3–6, a second embodiment of the invention will be described. FIG. 3(a) is a plan view of a device substrate of a liquid crystal display apparatus according to the present embodiment, and FIG. 3(b) is a cross-sectional view of the same taken along line A–A' of FIG. 3(a). In FIG. 3(b), layers that are formed after the formation of orientation films are not shown for simplicity. In the first embodiment described above, the electrical connection between the light shielding layer 9 and the common electrode interconnection line 10 is performed separately for each pixel thereby maintaining the light shielding layer at a fixed potential. In contrast, in this second embodiment, the light shielding layer is fixed to a given potential not inside a pixel but at a periphery of a pixel. FIG. 4 is an equivalent circuit associated with the present embodiment. In this embodiment, it is not necessary to dispose a connection region for connecting a light shielding layer 9 to a low-resistance layer 10 inside a pixel. Therefore, the present embodiment can provide a greater open area ratio than the first embodiment. Furthermore, there are a smaller number of contacts and smaller steps than in the first embodiment, which results in a reduction in short circuits between interconnections, and thus leads to an improvement in production yield. Furthermore, orientation failures of the liquid crystal arising from steps occur to a less degree, and thus there a smaller number of white defects and it is possible to obtain higher contrast. The electrical connection for controlling the potential of the light shielding layer 9 can be accomplished by means of bonding or pressure welding in an external connection area wherein the light shielding material extending to the external connection area. Alternatively, it is also possible, as shown in FIG. 5, to make electrical connection to the light shielding layer 9 via a low-resistance interconnection line 20 made up of for example Al that extends to the external connection area. In a further alternative shown in FIG. 6, effects similar to those of FIG. 5 can be achieved by a simpler production process. In this case, a jumper layer 21 is employed wherein the jumper layer 21 is formed by the same process as that for the formation of the pixel electrode 4. In the example shown in FIG. 5, it is required to form, in a dedicated process step, a hole for connecting the light shielding layer 9 to the interconnection line 20. In contrast, in the example of FIG. 6, the process of making a hole for an electrical connection to the pixel electrode 4 can be used to make a hole for the electrical connection to the light shielding layer 9. This allows simplification in the production process.

Embodiment 3

Figure 7:
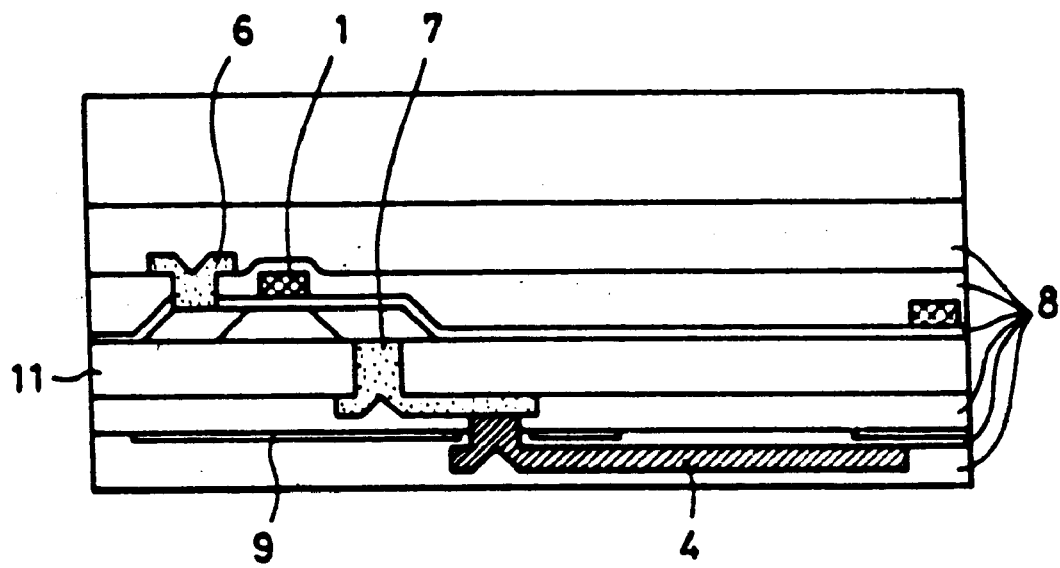
FIG. 7 is a schematic diagram illustrating another embodiment of a liquid crystal display apparatus according to the present invention.

FIG. 7 is a schematic diagram illustrating the configuration of a liquid crystal display apparatus according to a third embodiment of the invention. In this embodiment, pixel electrodes are disposed on the surface of an insulating film formed on the back side of the TFT layer.

In this case, since the pixel electrodes and TFTs are disposed on the surfaces opposite to each other, there are smaller steps near the pixel electrodes. This allows a better orientating process. In the configuration of this embodiment, a light shielding layer 9 is disposed on the same side as that where the pixel electrodes 4 are located, and storage capacitors are disposed between the light shielding layer 9 and the pixel electrodes 4. Since the light shielding layer 9 and a film 8 disposed between the light shielding layer 9 and the pixel electrodes 4 both have a very small thickness such as about 1000 Å, no increase occurs in the height of the steps near the pixel electrodes 4.

FIG. 9 illustrates a production process for producing the structure of this embodiment. As shown in FIG. 9, TFTs are formed on an insulating film 810 on a silicon substrate 801 (refer to FIG. 9(b)). Then, as shown in FIG. 9(c), a transparent substrate 803 is bonded via an adhesive layer 802 to the upper surface of the silicon substrate (a). Furthermore, the back surface of the silicon substrate is lapped and etched until the insulating film 810 is exposed (FIG. 9(d)). Then, a light shielding layer and pixel electrodes are formed on the back surface (refer to FIG. 7).

Embodiment 4

Figure 8:
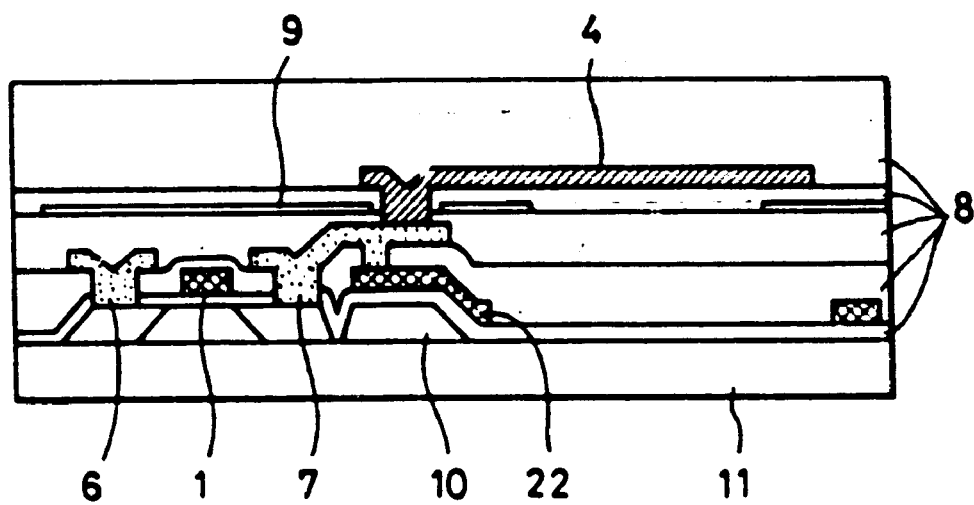
FIG. 8 is a schematic diagram illustrating another embodiment of a liquid crystal display apparatus according to the present invention.
Figure 9A:
FIGS. 9(a)–(d) is a schematic diagram illustrating an example of a production process of the liquid crystal display apparatus according to the present invention.
Figure 9B:
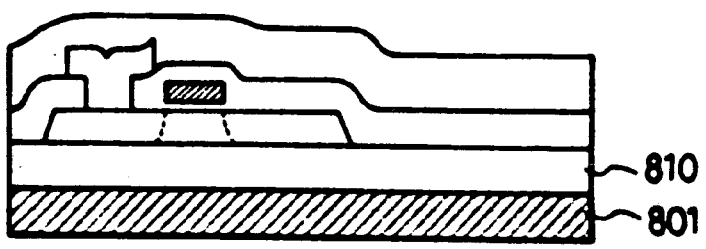
Figure 9C:
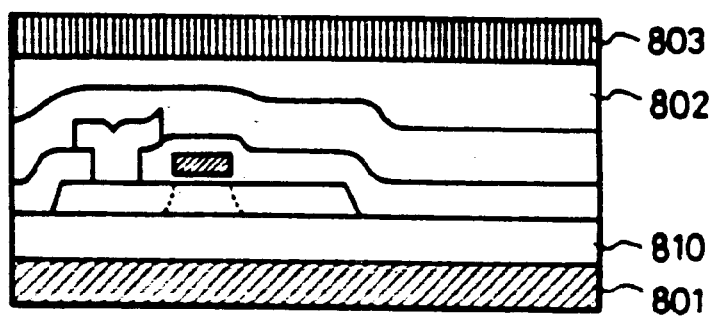
Figure 9D:
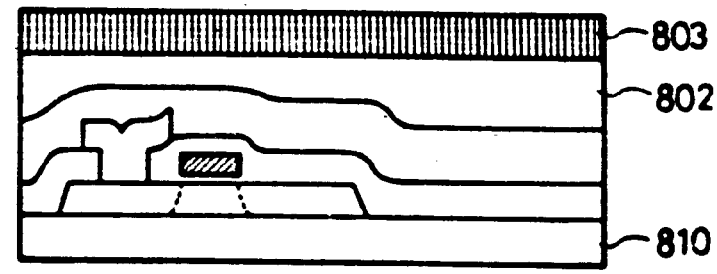
Figure 10A:
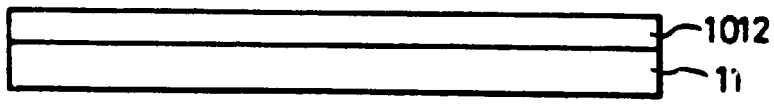
FIGS. 10(a)–(e) is a schematic diagram illustrating another example of a production process of the liquid crystal display apparatus according to the present invention.
Figure 10B:
Figure 10C:
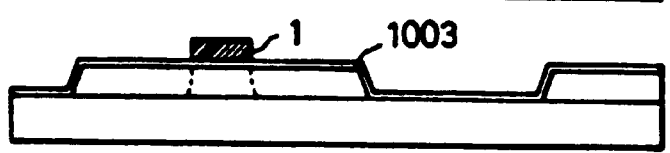
Figure 10D:
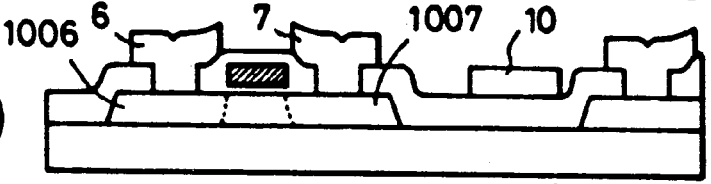
Figure 10E:
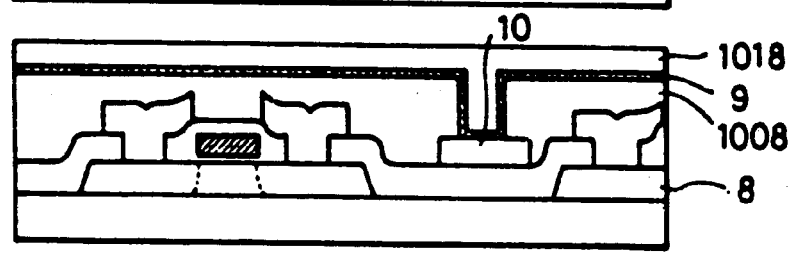

FIG. 8 is a schematic diagram illustrating the configuration of a liquid crystal display apparatus according to a fourth embodiment of the invention. In this embodiment, electrodes 22 are formed in the same process step for forming gate electrodes 1. The electrodes 22 are connected to the corresponding drain electrodes 7. Second storage capacitors are disposed between a low-resistance layer 10 and the electrodes 22, and these second storage capacitors are electrically connected in parallel to the corresponding first storage capacitors formed between the light shielding layer 9 and the pixel electrodes 4. In this embodiment, the light shielding layer is used effectively such that the second storage capacitors are formed under the light shielding layer. This allows not only an addition of storage capacitance but also an increase in the open area ratio.

Embodiment 5

Figure 13:
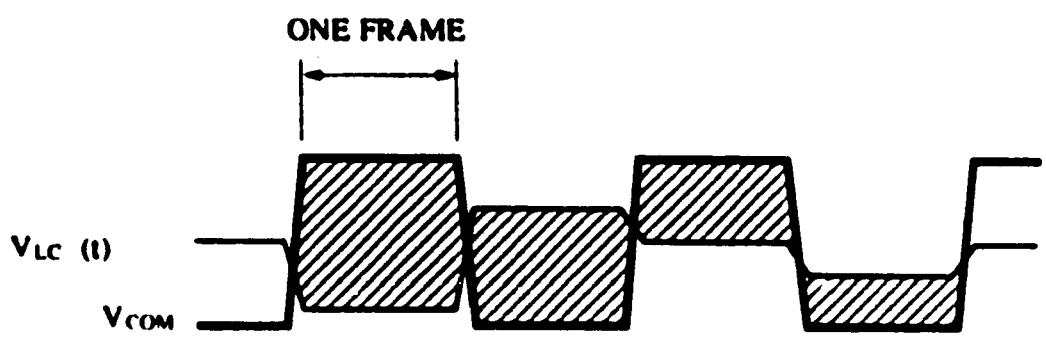
FIG. 13 is a schematic representation of the timing of driving pulses applicable to the liquid crystal display apparatus according to the present invention.
Figure 14A:
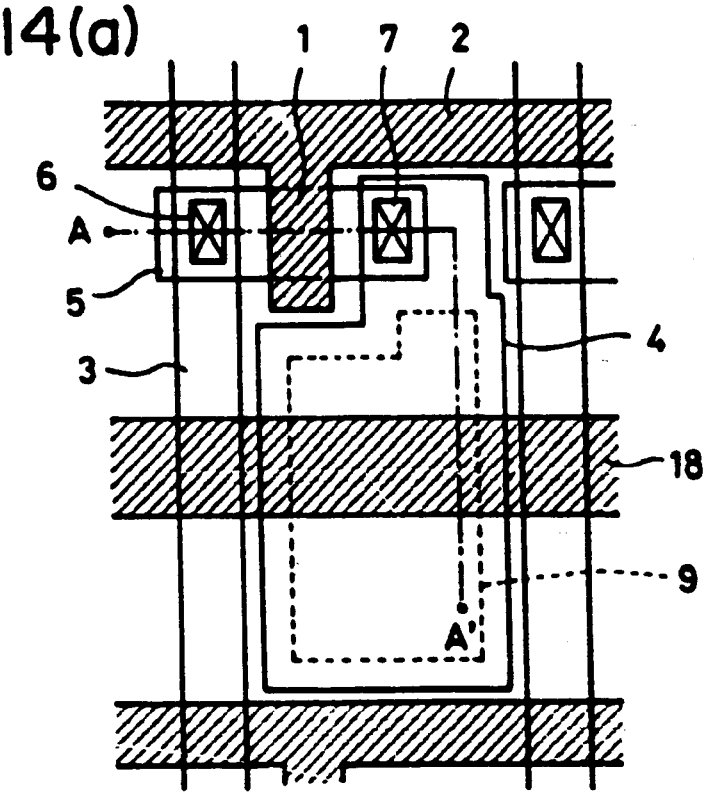
FIGS. 14(a) and (b) is a schematic diagram illustrating a conventional liquid crystal display apparatus.
Figure 14B:
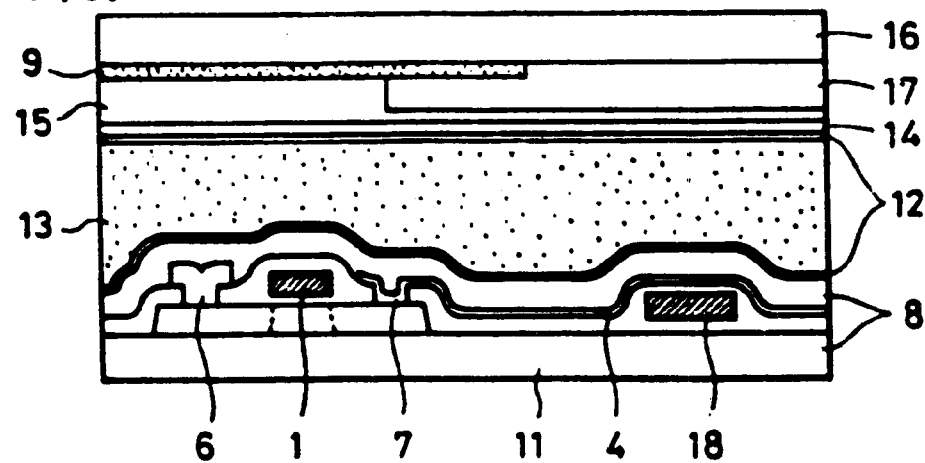
Figure 15:
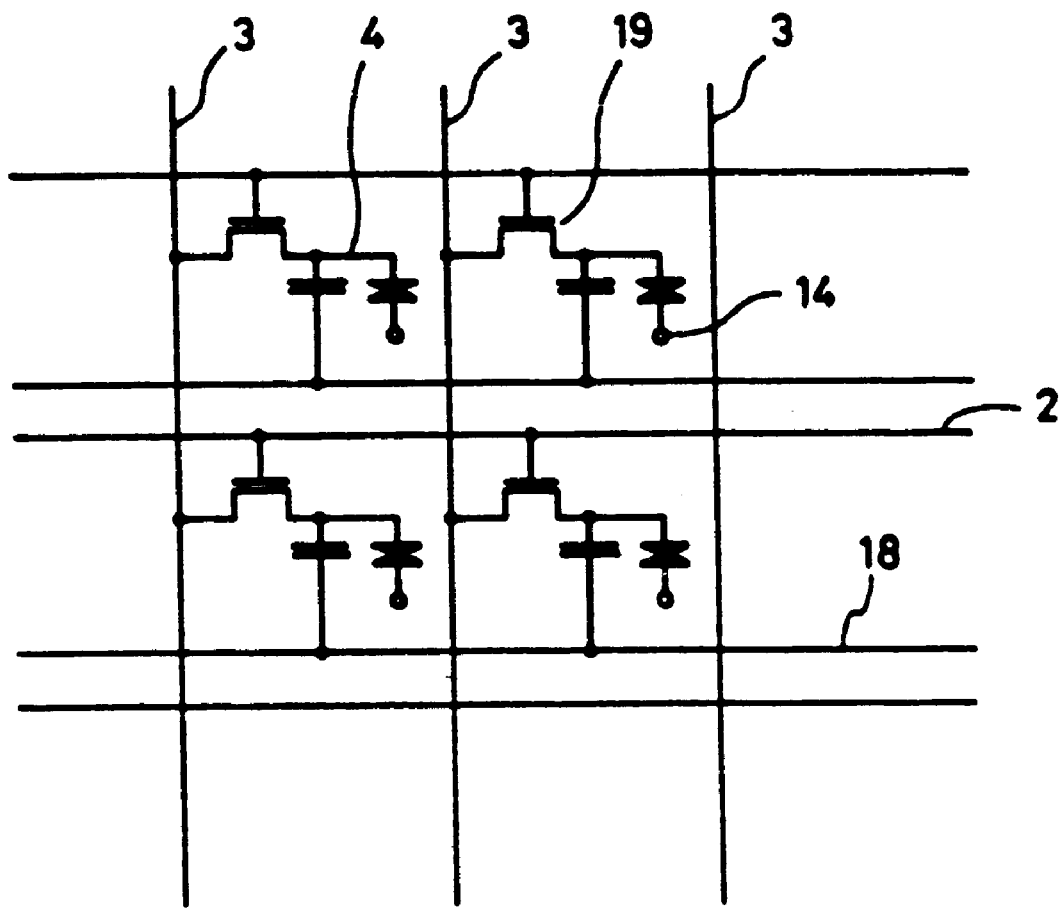
FIG. 15 is an equivalent circuit of the conventional liquid crystal display apparatus.
Figure 16:
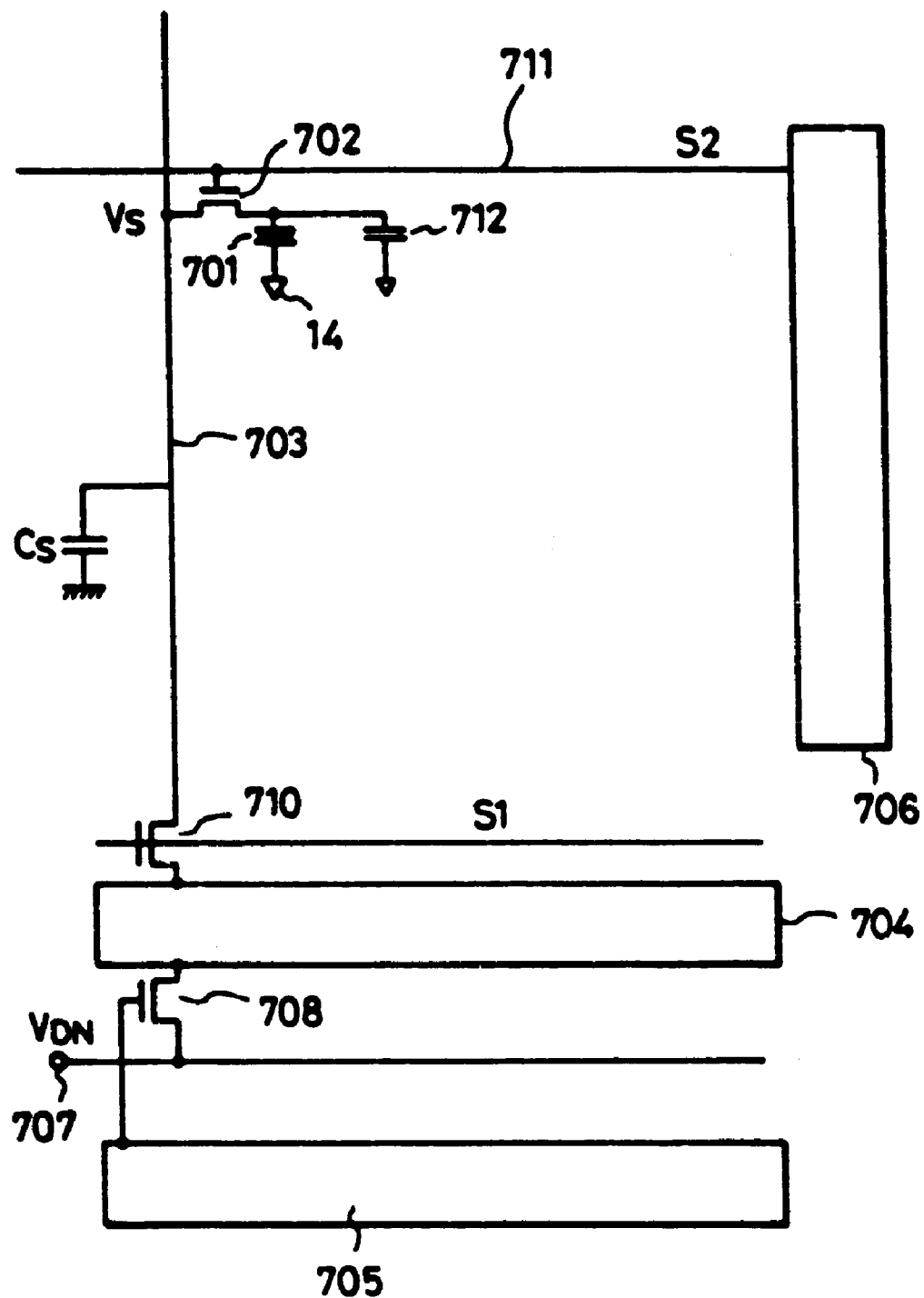
FIG. 16 is a basic circuit of a liquid crystal display apparatus.
Figures 17, 18:
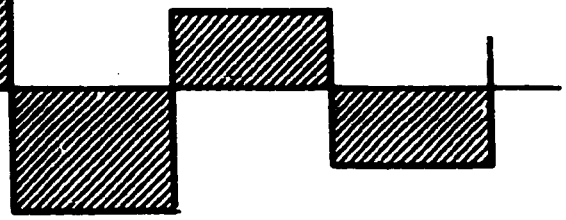
FIG. 17 is a graph illustrating the change in transmittance of a liquid crystal cell.
FIG. 18 is a schematic diagram for explanation of operation of a liquid crystal cell.

In this fifth embodiment, the potential of opposite electrodes disposed opposite to an active matrix substrate may be varied. In the liquid crystal display apparatus according to the present invention, it is possible either to maintain the potential $V_{COM}$ of the opposite electrodes at a fixed value or the invert it every frame as shown in FIG. 13. If the potential $V_{COM}$ is inverted as in the case of this fifth embodiment, it becomes possible to reduce the amplitude of the signal voltage, and therefore it becomes possible to simplify a circuit for generating the signal voltage and reduce the power consumption. Furthermore, this reduction in the amplitude of the signal voltage produces an additional advantage that a less severe condition is required associated with the breakdown voltage of shift pulse switches used to transfer the signal inside the liquid crystal device and therefore the reliability is improved.

For example, if it is assumed that a maximum effective voltage of 5 V is needed as a voltage applied to a liquid crystal, then in the case where the voltage $V_{COM}$ is not inverted, the signal voltage should have an amplitude of ±5V–10V. In contrast, in the case where the voltage $V_{COM}$ is inverted every frame as in this embodiment, the signal voltage applied to the liquid crystal needs an amplitude as small as ±2.5V–5V. The voltage $V_{COM}$ is not necessarily needed to be inverted every frame. Alternatively, it may also be inverted every horizontal scanning period, or every time period determined depending on the pixel structure. The amplitude of the inverting voltage $V_{COM}$ is not limited to 5 V. It may also have another proper value.

As described above with reference to several specific embodiments, in the liquid crystal display apparatus according to the present invention, a light shielding layer is disposed between a pixel electrode layer and a data signal interconnection layer or a scanning signal interconnection layer and a voltage is applied to the light shielding layer so that storage capacitance is formed between the pixel electrode and the light shielding layer. This structure according to the invention allows an addition of storage capacitance thereby suppressing the incidental image, flicker, and burning of the liquid crystal, and also improving the contrast, with no penalty in the open area ratio and in the available amount of light.

What is claimed is:

1. A method of producing a device substrate for use in an active matrix type liquid crystal display apparatus, in which the device substrate is arranged opposite a common electrode substrate with a layer of liquid crystal material therebetween, said device substrate having on a base substrate: a plurality of switching elements disposed at a plurality of locations determined by the crossing of data signal lines and scanning signal lines; a plurality of pixel electrodes disposed at locations corresponding to said plurality of switching elements, said plurality of pixel electrodes being connected to the corresponding switching elements, and wherein a conductive light shielding layer is disposed at least partially on said data signal lines and said scanning signal lines with an insulating layer therebetween, and wherein said pixel electrodes is disposed at least partially on said conductive light shielding layer with a second insulating layer therebetween, and means for applying a voltage to said light shielding layer, the method comprising steps of:

providing the base substrate having thereon said switching elements, said data signal lines, said scanning signal lines and said voltage applying means;

forming said insulating layer on said switching elements, said data signal lines, said scanning signal lines and said voltage applying means;

forming said light shielding layer on said insulating layer;

forming said second insulating layer on said light shielding layer and on said insulating layer;

opening contact holes in said second insulating layer and in said insulating layer to expose said voltage applying means and a contact portion of each of said switching elements;

opening a contact hole in said second insulating layer to expose said light shielding layer, and depositing conductive material for forming said pixel electrodes in contact with the corresponding contact portion of each of the corresponding switching elements and for forming, at the same time, a connection between said light shielding layer and said voltage applying means by a conductor through the contact hole in said second insulating layer.

2. A method of producing an active matrix liquid crystal display apparatus comprising steps of:

producing a device substrate by the method of claim 1;

providing a common electrode substrate;

arranging said device substrate and said common electrode substrate with said pixel electrodes facing the common electrode of said common electrode substrate; and sealing a layer of liquid crystal material between said device substrate and said common electrode substrate.

3. A device substrate for use in an active matrix type liquid crystal display apparatus, said device substrate comprising:

a base substrate bearing a plurality of switching elements disposed at a plurality of locations determined by the crossing of data signal lines and scanning signal lines, a plurality of pixel electrodes disposed at locations corresponding to said plurality of switching elements, said plurality of pixel electrodes being connected to the corresponding switching elements;

a conductive light shielding layer disposed at least partially on said data signal lines and said scanning signal lines with an insulating layer therebetween;

a second insulating layer disposed between said pixel electrodes and said light shielding layer, wherein said pixel electrodes are arranged to overlap said light shielding layer; and means for applying a voltage to said light shielding layer, wherein said voltage applying means and said light shielding layer are electrically connected by a connection member of the same material as that of said pixel electrodes.

4. An active matrix type liquid crystal display apparatus comprising:

the device substrate of claim 3;

a common electrode substrate arranged with its common electrode arranged facing the pixel electrodes of said device substrate, and a layer of liquid crystal material sealed between said device substrate and said common electrode substrate.

5. An active matrix type liquid crystal display apparatus according to claim 4, wherein said light shielding layer comprises Al, TaN, or TiN.

6. An active matrix type liquid crystal display apparatus according to claim 4, wherein said switching elements are thin film transistors.

7. An active matrix type liquid crystal display apparatus according to claim 4, wherein said light shielding layer is maintained at a fixed potential.

8. An active matrix type liquid crystal display apparatus according to claim 4, wherein a voltage corresponding to the voltage of said plurality of pixel electrode is applied to said light shielding layer.

9. An active matrix type liquid crystal display apparatus according to claim 4, wherein said light shielding layer is disposed on the same side on which said pixel electrodes are located with respect to said switching elements.

10. An active matrix type liquid crystal display apparatus according to claim 4, wherein the voltage applied to said common electrode is varied periodically.

11. A device substrate for use in an active matrix type liquid crystal display according to claim 3, wherein said light shielding layer comprises Al, TaN, or TiN.

12. A device substrate for use in an active matrix type liquid crystal display according to claim 3, wherein said switching elements are thin film transistors.

13. A device substrate for use in an active matrix type liquid crystal display according to claim 3, wherein said light shielding layer is maintained at a fixed potential.

14. A device substrate for use in an active matrix type liquid crystal display according to claim 3, wherein a voltage corresponding to the voltage of said plurality of pixel electrode is applied to said light shielding layer.

15. A device substrate for use in an active matrix type liquid crystal display according to claim 3, wherein said light shielding layer is disposed on the same side on which said pixel electrodes are located with respect to said switching elements.

* * * * *

UNITED STATES PATENT AND TRADEMARK OFFICE
CERTIFICATE OF CORRECTION

PATENT NO. : 6,075,580
DATED : June 13, 2000
INVENTOR(S) : TETSUNOBU KOUCHI

It is certified that error appears in the above-identified patent and that said Letters Patent is hereby corrected as shown below:

COLUMN 2

Line 38, "vide" should read --video--;
Line 56, "vide" should read --video--;
Line 57, "vide" should read --video--.

COLUMN 3

Line 18-23, " $\sqrt{\dfrac{1}{t_F} \int_0^{t_F} (V_{LC}(t) - V_{COM}) \cdot dt}$ " should read -- $\sqrt{\dfrac{1}{t_F} \int_0^{t_F} (V_{LC}(t) - V_{COM})^2 dt}$ --;

Line 57, "an" should read --a--;
Line 58, "boding" should read --bonding--;
Line 63, "suing" should read --using--.

COLUMN 5

Line 1, "is a schematic diagram" should read --are schematic diagrams--;
Line 4, "is a schematic diagram" should read --are schematic diagrams--.

UNITED STATES PATENT AND TRADEMARK OFFICE
CERTIFICATE OF CORRECTION

PATENT NO. : 6,075,580
DATED : June 13, 2000
INVENTOR(S) : TETSUNOBU KOUCHI

It is certified that error appears in the above-identified patent and that said Letters Patent is hereby corrected as shown below:

COLUMN 7

Line 36, line 36 should be deleted;
Line 42, "$\Delta V_{LC2} = -\Delta V_{LC1}$," should read --If the value of $\Delta V_{ADD}$ is properly selected so that $\Delta V_{LC2} = -\Delta V_{LC1}$,--.

COLUMN 8

Line 12, "extending" should read --extends--.

COLUMN 9

Line 11, "the invert" should read --to invert--.

COLUMN 11

Line 8, "electrode" should read --electrodes--.

UNITED STATES PATENT AND TRADEMARK OFFICE
CERTIFICATE OF CORRECTION

PATENT NO.  : 6,075,580
DATED       : June 13, 2000
INVENTOR(S) : TETSUNOBU KOUCHI It is certified that error appears in the above-identified patent and that said Letters Patent is hereby corrected as shown below:

<u>COLUMN 12</u>

Line 11, "electrode" should read --electrodes--.

Signed and Sealed this

Twenty-fourth Day of April, 2001

Attest:

NICHOLAS P. GODICI

*Attesting Officer*      *Acting Director of the United States Patent and Trademark Office*